United States Patent [19]

Dujardin et al.

[11] Patent Number: 5,137,971

[45] Date of Patent: Aug. 11, 1992

[54] GRAFT COPOLYMERS, THEIR PRODUCTION AND USE

[75] Inventors: Ralf Dujardin, Krefeld; Richard Weider, Leverkusen; Peter Horlacher, Senden; Werner Nouvertné, Krefeld, all of Fed. Rep. of Germany

[73] Assignee: Bayer Aktiengesellschaft, Leverkusen, Fed. Rep. of Germany

[21] Appl. No.: 648,086

[22] Filed: Jan. 31, 1991

[30] Foreign Application Priority Data

Feb. 15, 1990 [DE] Fed. Rep. of Germany ....... 4004676

[51] Int. Cl.⁵ .................. C08L 69/00; C08G 64/18
[52] U.S. Cl. ................................ 525/69; 525/63; 525/146; 525/147
[58] Field of Search .................. 525/63, 69, 133, 146, 525/147

[56] References Cited

U.S. PATENT DOCUMENTS

| 3,461,187 | 8/1969 | Cantrill | 525/146 |
| 3,687,895 | 8/1972 | Vernaleken et al. | 260/47 UA |
| 3,991,009 | 11/1976 | Margotte et al. | 260/42.18 |
| 4,278,572 | 7/1981 | Coran | 525/63 |
| 4,677,183 | 6/1987 | Mark | 525/147 |
| 4,728,716 | 3/1988 | Mark | 525/147 |
| 4,874,816 | 10/1989 | Dujardin et al. | 525/146 |
| 4,888,401 | 12/1989 | Kawaki et al. | 525/468 |

FOREIGN PATENT DOCUMENTS 63-268703  11/1988  Japan.

Primary Examiner—James J. Seidleck
Assistant Examiner—David Buttner
Attorney, Agent, or Firm—Joseph C. Gil; Aron Preis

[57] ABSTRACT

A process for producing a graft copolymer is disclosed. The graft copolymer, based on a rubber which contains phenolic OH groups and grafted with polycarbonate chains is produced under the conditions of the two-phase interfacial polycondensation. Also disclosed are gasoline resistant thermoplastic polycarbonate compositions containing the graft.

7 Claims, No Drawings

GRAFT COPOLYMERS, THEIR PRODUCTION AND USE

Graft copolymers are understood to be polymers having branched basic units in which different kinds of polymers often incompatible with one another are attached to one another by chemical bonds so that products having new combinations of properties are formed.

Graft copolymers derived solely from polymers are well-known (G. Riess in "Encyclopedia of Polymer Science and Engineering", 2nd Ed., Vol. 2, pp. 324–434, 1985 and the literature cited therein), whereas polymer combinations of polymers as the graft base and polycondensates as grafted-on side chains have hitherto received relatively little attention (Polymer Science and Technology, Vol. 4 "Recent Advances in Polymer Blends, Grafts and Blocks", ed. by L. H. Sperling, Plenum Press New York, London 1974). In the latter case, some difficulty is involved in polymerizing into the polymer backbone suitable monomers which co-react in a polycondensation reaction whereas, in the first case, radical grafting can be carried out on the unmodified polymer backbone.

Phenolic-OH groups on the polymer backbone are of importance for the grafting-on of polycarbonate chains from the point of view of stability, reactivity, i.e. uniformity of the graft copolymers obtained, and, hence, from the point of view of the mechanical properties of the graft copolymers obtained.

Grafting reactions such as these onto polymers containing phenolic OH groups are known (cf. for example DE-AS 1 770 144 (Le A 11 295) or U.S. Pat. No. 3,687,895, DE-OS 2 357 192 (Le A 15 222), DE-OS 3 717 172 (Le A 25 000) and EP-OS 0 293 908) or, for example, are the subject of German patent application P 39 11 222.5 (Le A 26 692)).

DE-OS 2 702 626 (Le A 17 356) describes the production of high molecular weight, segmented polycarbonate elastomers, the elastic segments being introduced via COOH polymers containing 1 to 5 COOH groups.

Branched segment polymers are known from DE-OS 2 712 230 (Le A 17 926), branched or partly crosslinked, living aromatic vinyl compound/diene block polymer anions being reacted with special aromatic polycarbonates.

It has now been found that it is possible to obtain thermoplastic graft copolymers based on hydroxyphenyl-functionalized rubbers with grafted-on polycarbonate side branches and even based on high molecular weight polymer backbones which show an ideal combination of properties, namely the resistance to solvents typical of rubbers coupled with tough thermoplastic properties.

The rubbers to be used for the polymer backbone and their production are the subject of German patent application 40 00 625.5 (Le A 27 441).

Particulars can be found in the wording of this German patent application P 40 00 625.5 which is reproduced hereinafter on pages 3 to 15 of the present application.

German patent application P 40 00 625.5 relates to a process for the production of a rubber containing 5 to 60 and preferably 5 to 40 phenolic OH groups, characterized in that rubbers having a double bond content of 3 to 250 per 1000 carbon atoms in the rubber and preferably from 3 to 10 per 1000 carbon atoms in the rubber are reacted in bulk with phenols, optionally in the presence of a catalyst, for 1 minute to 30 minutes at temperatures in the range from 50° C. to 150° C. and preferably at temperatures in the range from 70° C. to 130° C. The reaction product is cooled and granulated in the usual way.

German patent application P 40 00 625.5 also relates to the rubbers obtainable by the process according to the invention.

Prior Art

JA 63-268 703 describes hydrocarbon polymers, such as hydrogenated polybutadiene, which bear hydroxyphenyl-terminated hydrocarbon chains either terminally or as grafted-on side chains. They are produced, for example, from hydrogenated polybutadiene containing alcoholic OH⁻ groups and methyl salicylate in the presence of p-toluene sulfonic acid. However, the terminal hydroxyphenyl groups may also be introduced during the synthesis of the hydrocarbon chains via anionic polymerization of dienes with incorporation of p-hydroxystyrene of which the hydroxy group is temporarily masked.

JA 52/009 098 (only available as an abstract) describes reaction products of rubbers with phenols in the presence of Friedel-Crafts catalysts which are reacted to polyphenylene oxides by oxidative coupling.

Hydrocarbon resin/polyphenylene ether comb polymers are known from DE-OS 3 509 093 and from EP-A 0 195 199.

These comb polymers are obtained by reacting hydrocarbon resins, i.e. rubbers, with phenols in the presence of an acid (see page 8 of DE-OS 3 509 093).

It can be seen from Example 1 of DE-OS 3 509 093 that the reaction takes place in solution.

However, acid-catalyzed reactions such as these have the disadvantage that the phenols are polyalkylated in the ring by the unsaturated groups of the hydrocarbon resins.

To avoid this, special phenols which can only be alkylated once by virtue of their predetermined substitution are used in accordance with DE-OS 3 509 093 or EP-A 0 195 199 (cf. the phenols (IV) on page 8 and in claim 1 of DE-OS 3 509 093).

Corresponding reaction products of hydrocarbon resins with phenols are known from EP-A 0 236 554. In this case, too, only the reaction in solution is described. Once again, it can be seen (cf. the "Makromol Chem." 24, 205 et seq. (1972), more particularly page 212, cited on page 3 of EP-A-0 236 554) that polyalkylation takes place, resulting in crosslinking of the products. It has now surprisingly been found that even polyalkylatable phenols, i.e. phenols unsubstituted in at least two ortho and/or para positions, can be attached to rubbers without crosslinking.

Suitable phenols for the process according to German patent application P 40 00 625.5 are, preferably, those corresponding to formula (I)

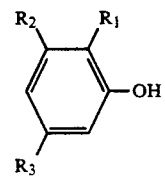

in which $R_1$, $R_2$ and $R_3$ independently of one another may be the same or different and represent H, $C_{1-12}$ alkyl, cyclohexyl, phenyl, $C_{1-12}$ alkoxy, $C_{1-6}$ alkylphenyl, phen-$C_{1-6}$-alkyl, fluorine or chlorine. In addition, $R_1$ and $R_2$ may form a fused, cycloaliphatic or aromatic 6-ring.

Other suitable phenols for the process are, preferably, those corresponding to formula (II)

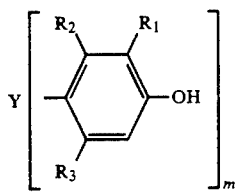

in which $R_1$ to $R_3$ are as defined for formula (I), m is 1 or 2 and Y is a radical-reactive group.

In the present context, a radical-reactive group Y is preferably an alkenyl group, an HS-group, an alkyl mercaptan group or a polysulfide bridge containing in particular 2 to 8 S atoms.

Suitable phenols corresponding to formula (I) are, for example, phenol; chlorophenols, such as 2-chlorophenol, 3-chlorophenol, 4-chlorophenol, 2,5-dichlorophenol; alkylphenols, such as technical cresol, 2-methylphenol, 3-methylphenol, 4-methylphenol, 2,3-dimethylphenol, 3,4-dimethylphenol, 3,5-dimethylphenol, 2,5-dimethylphenol, 2,3,5-trimethylphenol, 2-ethylphenol, 2-isopropylphenol, 3-ethyl-5-methylphenol, 2-sec.-butylphenol, 2-tert.-butylphenol, 4-tert.-butylphenol, 2-isopropyl-5-methylphenol, 3-isopropyl-5-methylphenol, 4-tert.-pentylphenol, 4-(1,1,3,3-tetramethylbutyl)-phenol, nonylphenol, dodecylphenol; 4-cyclohexylphenol, 2-cyclohexylphenol; 2-phenylphenol, 4-phenylphenol, 3-phenylphenol; 5,6,7,8-tetrahydro-1-naphthol, 1,1,3,3-tetramethyl-5-indanol, 1-naphthol, 1-anthrol; benzylphenol; 3-methoxyphenol, 2-methoxyphenol, 2-ethoxyphenol, 2-isopropoxyphenol and 4-methoxyphenol.

Suitable phenols corresponding to formula (II) are, for example, 4-mercaptophenol, 4-methylmercaptophenol; bis-(4-hydroxyphenyl)-disulfide, bis-(4-hydroxyphenyl)-trisulfide, bis-(4-hydroxy-3-methylphenyl)-disulfide, 4-vinylphenol, 2-methyl-4-vinylphenol, 3-methyl-4-vinylphenol, 4-isopropenylphenol, 2-methyl-4-isopropenylphenol and 4-(1-buten-2-yl)-phenol.

Preferred phenols corresponding to formulae (I) and (II) are phenol, 2-methylphenol, 3-methylphenol, 4-methylphenol, naphtol, 4-isopropenylphenol and bis-(4-hydroxyphenyl)-disulfide.

Phenol is particularly preferred.

Catalysts suitable for the reaction with the phenols corresponding to formula (I) are protonic acids, such as for example sulfuric acid, phosphoric acid, phosphorous acid, hydrohalic acids, perchloric acid or strong organic acids, such as alkyl or aryl sulfonic acid, such as methanesulfonic acid, 2-chloroethanesulfonic acid, trifluoromethanesulfonic acid, perfluorobutane-1-sulfonic acid, benzenesulfonic acid, toluenesulfonic acid, naphthalenesulfonic acid, 1,3-benzene disulfonic acid and benzylsulfonic acid; formic acid, acetic acid, trichloroacetic acid, or Lewis acids, such as for example boron trifluoride, aluminium chloride, zinc chloride, iron(III) chloride, tin tetrachloride, titanium(IV) chloride or mixtures of the catalysts mentioned.

Catalysts suitable for reaction with the phenols corresponding to formula (II) are azo compounds, such as for example azo-bis-isobutyronitrile, 2,2'-azo-bis-(2,4-dimethylvaleronitrile), (1-phenylethyl)-azodiphenylmethane, dimethyl-2,2'-azo-bis-isobutyrate, 1,1'-azo-bis-(1-cyclohexane carbonitrile), 2,2'-azo-bis-(2,4,4-trimethylpentane), 2,2'-azo-bis-(2-methylpropane), or organic peroxides, such as for example diacyl peroxides, such as dilauroyl peroxide, diacetyl peroxide, dibenzoyl peroxide; peroxydicarbonates, such as diacetyl peroxydicarbonate; alkyl peresters, such as tert.-butyl per-2-ethyl hexanoate, tert.-butyl perisononanoate, tert.-butyl perbenzoate; dialkyl peroxides, such as dicumyl peroxide, di-tert.-butyl peroxide, di-(tert.-butylperoxyisopropyl)-benzene; alkyl hydroperoxides, such as cumene hydroperoxide, tert.-butyl hydroperoxide, or perketals and ketone peroxides, such as 2,2-bis-(tert.-butylperoxy)-butane and methylethyl ketone peroxide.

Preferred catalysts for phenols corresponding to formula (I) are alkyl and aryl sulfonic acids, methane sulfonic acid being particularly preferred.

The quantity in which the catalyst is used depends upon the type and quantity of the phenol, the reactivity of the rubbers used and the desired phenol content in the end product and is from 0 to 0.2 mol and preferably from 0.05 to 0.1 mol per mol phenol. No catalyst need be used if the phenol used has sufficient acid strength. The reaction with the reactive phenols generally takes place in the absence of catalysts by thermal activation of the reactive substituents.

Hydroxyphenyl groups may be introduced into a large number of rubbers by the described process.

Natural or synthetic rubbers or mixtures thereof which have an Mn of greater than 40,000 and preferbly in the range from 40,000 to 200,000 may be used for the process according to German patent application P 40 00 625.5. It is possible to use homopolymers of a diene, copolymers of at least two conjugated dienes, copolymers of at least one conjugated diene and at least one other olefinic monomer, polymers obtained by ring-opening polymerization of a cycloolefin, copolymers of a cyclic unconjugated diene and at least one other olefinic monomer, polymers obtained by partial hydrogenation of the polymers mentioned or mixtures thereof. The following rubbers are mentioned in particular: natural rubber, synthetic rubbers, such as polybutadiene, styrene/butadiene rubbers, acrylonitrile/butadiene rubbers, partly hydrogenated acrylonitrile butadiene rubbers, polychloroprene, isoprene/isobutylene rubbers, halogenated copolymers of isoprene and isobutylene, ethylene/propylene/diene rubbers, propylene oxide/allyl glycidyl ether copolymers, polyoctenylene and polynorbornene.

Preferred polymers are those which represent a terpolymer of 20 to 60% by weight propene, 40 to 80% by weight ethene and 1.5 to 13% by weight of a diene containing 4 to 25 carbon atoms, preferably a 5-alkylidene-2-norbornene, in which the alkylidene group contains 2 to 5 carbon atoms, and which have an Mn of greater than 40,000.

Other preferred polymers are copolymers of 55 to 85% by weight butadiene and 15 to 45% by weight acrylonitrile, in which 90 to 99% of the double bonds present have been saturated by hydrogenation. Within this group, copolymers of 55 to 70% by weight butadiene and 30 to 45% by weight acrylonitrile in which 93 to 97% of the double bonds present have been saturated by hydrogenation are particularly preferred.

Particularly suitable rubbers according to German patent application P 40 00 625.5 are rubbers which have Mooney viscosities of at least 30 and preferably from 30 to 150 (as measured in accordance with DIN 53 523 (Part 1-3); ASTM-D 1646-74 at 100° C.) in addition to the required $\overline{M}_n$ of at least 40,000 and preferably in the range from 40,000 to 200,000.

In the process, the ratio of phenols to rubbers has to be gauged in such a way that 1 to 5 mol phenolic OH group in the reaction mixture is used per phenolic OH group in the reaction product.

The process according to German patent application P 40 00 625.5 is carried out in the absence of a solvent by intensive mixing of the components in a mixing unit of the type typically used for processing rubber or plastics, for example a reaction screw, extruder or kneader. The reaction time is between 1 and 30 minutes. Any excess phenol may be removed after the reaction in a vacuum stage, by stripping with steam or by extraction with a solvent.

The mixing temperature is in the range from 50° C. to 150° C. and preferably in the range from 70° C. to 130° C. The reaction product is cooled and then granulated or compacted in known manner.

The following substances known per se may be used as additional additives during or after the reaction according to the invention: stabilizers, such as antiagers, antifatigue agents and antiozonants, plasticizers, fillers, pigments, factices, release agents or powdering agents and also the vulcanization auxiliaries typically used in the rubber industry.

The rubbers obtainable by the process according to German patent application P 40 00 625.5 may be vulcanized to moldings of any kind, which is possible in the usual way by known vulcanization methods.

The moldings obtained, for example seals, may be industrially used in the same way as typical rubber articles.

However, the rubbers obtainable in accordance with German patent application P 40 00 625.5 may even be used without vulcanization as a mixing component in other rubbers, for example to improve their tackiness.

EXAMPLES

EXAMPLE 1

An EPDM resin (copolymer consisting of 50% by weight ethylene, 41% by weight propylene and 9% by weight 5-ethylidene bicyclo-(2,2,1)-hept-2-ene, Mooney viscosity ML (1+4) at 100° C.=90, $\overline{M}_n$ approx. 95,000) is mixed with 9% by weight of a mixture of phenol and methanesulfonic acid (99:1) in a twin-screw extruder at a cylinder temperature of 90° C., the twin-screw extruder being provided with a vacuum evaporation attachment in its end zone to remove the excess phenol. The exit temperature is approximately 120° C. and the average residence time to the vacuum stage is approximately 12 minutes. The strand issuing from the extruder is passed through a water bath, air-dried and then granulated with addition of 1% by weight talcum. The content of bound phenol according to IR measurements is 2.8 to 3.2% by weight. The free-flowing granules dissolve without gel formation and can be sheeted out.

EXAMPLE 2

An EPDM resin (copolymer consisting of 68% by weight ethylene, 27% by weight propylene and 5% by weight 5-ethylidene bicyclo-(2,2,1)-hept-2-ene, Mooney viscosity ML (1+4) at 100° C.=85, $\overline{M}_n$ approx. 50,000) is treated as in Example 1, except that the granulation stage is carried out with bisphenol A polycarbonate powder instead of talcum. The content of bound phenol according to IR measurements is from 1.9 to 2.5% by weight. The product dissolves without gel formation and can be sheeted out.

EXAMPLE 3

The procedure is as in Example 2, except that no powdering agent is added. By rapid cooling to approximately 20° C., the granules remain free-flowing.

EXAMPLE 4

10% By weight bisphenol A polycarbonate powder is added to the EPDM resin of Example 1 during introduction into the screw. The granules obtained remain free-flowing without powdering.

EXAMPLE 5

800 g of the EPDM resin of Example 1 are masticated in a 1.3 liter Pomini kneader at a jacket temperature of 60° C. and at a rotational speed of 40 1/min. After 1 minute, 72 g phenol, 7.2 g methanesulfonic acid and another 100 g EPDM resin are added, followed by mixing for another 8 minutes. The melt temperature rises to 90°-100° C. The melt is discharged into a water bath. After removal of the excess phenol by extraction with toluene/methanol, the content of bound phenol is determined by IR spectroscopy and measures 3.2% by weight. The product dissolves without gel formation and can be sheeted out.

EXAMPLE 6

A total of 900 g of an HNBR resin (copolymer of 43% by weight acrylonitrile and 57% by weight butadiene, Mooney viscosity ML (1+4) at 100° C.=75, $\overline{M}_n$ approx. 70,000, reduced by hydrogenation to 4% of the original double bond content) are treated as in Example 4. The content of bound phenol according to IR spectroscopy is 3.8% by weight. The product dissolves without gel formation and can be sheeted out.

EXAMPLE 7

2.12 g bis-(4-hydroxyphenyl)-disulfide are added to 45 g of the EPDM resin of Example 1 in a 70 ml kneader at a jacket temperature of 120° C. and at a rotational speed of 50 1/minute, followed by mixing for 10 minutes. The crude product is extracted with toluene/ethanol and the content of phenolic groups according to IR spectroscopy is 2.8% by weight.

EXAMPLE 8

2.3 g isopropenyl phenol are added to 45 g of the EPDM resin of Example 1 in a 70 ml kneader at a jacket temperature of 120° C. and at a rotational speed of 50 1/minute, followed by mixing for 10 minutes. The crude product is extracted with toluene/ethanol; the content of phenolic groups according to IR spectroscopy is 1.7% by weight.

Accordingly, the present invention relates to the use of the rubbers containing 5 to 60 and preferably 5 to 40 phenolic OH groups obtainable by the process according to German patent application P 40 00 625.5 (Le A 27 441) as polymer backbones for the production of graft polymers with grafting on of aromatic polycarbonates.

The quantity by weight in which the particular rubbers are used is from 5 to 65% by weight, based on the total weight of the graft copolymer.

In addition, monofunctional chain terminators are used in quantities of from 0.1 mol-% to 10 mol-%, preferably in quantities of 1 mol-% to 7 mol-% and more preferably in quantities of 2 mol-% to 5 mol-%, based on mols diphenols.

Whereas the quantity by weight and OH value of the rubbers determines the number of polycarbonate chains grafted on, the quantity of diphenols and monofunctional chain terminator regulates the length, i.e. the degree of polymerization, of the grafted-on polycarbonate chains.

It is also necessary in this regard to time the addition of the monofunctional chain terminator in such a way that the OH groups of the rubbers largely react off.

The present invention also relates to a process for the production of the graft copolymers according to the invention of polymers containing phenolic OH groups, diphenols, phosgene and monophenols in aqueous-alkaline phase in the presence of an inert organic solvent under two-phase interfacial polycondensation conditions, optionally in the presence of a catalyst, the quantity of diphenols and monophenols as chain terminators being selected so that polycarbonate chains having average molecular weights $\overline{M}n$ (number average, as determined by gel chromatography after preliminary calibration) in the range from 2000 g/mol to 250,000 g/mol, preferably in the range from 5000 g/mol to 200,000 g/mol and more preferably in the range from 7500 g/mol to 100,000 g/mol, characterized in that the rubbers containing 5 to 60 and preferably 5 to 40 phenolic OH groups obtainable by the process according to German patent application P 40 00 625.5 (Le A 27 441) are used as the polymers containing phenolic OH groups.

The present invention also relates to the graft copolymers obtainable by the process according to the invention.

Accordingly, between 8 mol and 1000 mol, preferably between 20 mol and 800 mol and more preferably between 30 mol and 400 mol diphenols are used per OH group of the polymer backbone; the quantity of chain terminator per OH group of the polymer backbone is 1 mol.

Diphenols which may be used in the grafting reaction to build up the polycarbonate side branches correspond to formula (III)

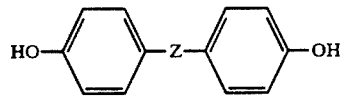

(III)

in which Z is a single bond, a $C_{1-8}$ alkylene radical, a $C_{2-12}$ alkylidene radical, a cycloalkylidene radical, a benzylidene radical, a methylbenzylidene radical, a bis-(phenyl)-methylene radical, —S—, —SO$_2$—, —CO— or —O—; the phenylene rings attached by Z may be mono- or disubstituted by methyl, bromine or chlorine, and optionally to formula (IV)

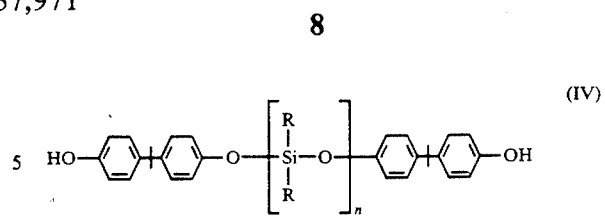

(IV)

in which

R = $C_{1-4}$ alkyl, preferably CH$_3$—, and n = 20 to 200 and preferably 40 to 80.

Other suitable diphenols of are those corresponding to formula (V)

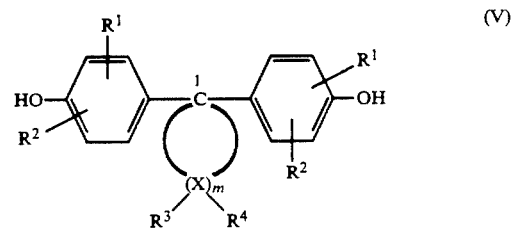

(V)

in which $R^1$ and $R^2$ independently of one another represent hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, more particularly benzyl, m is an integer of from 4 to 7, preferably 4 or 5, $R^3$ and $R^4$ may be individually selected for each X and independently of one another represent hydrogen or $C_1$-$C_6$ alkyl and X represents carbon, with the proviso that, at least one atom X, both $R^3$ and $R^4$ are alkyl.

Preferably at 1 to 2 atoms X and, more particularly, at only 1 atom X, both $R^3$ and $R^4$ are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted.

Particular preference is attributed to dihydroxydiphenyl cyclohexanes containing 5 and 6 ring C atoms in the cycloaliphatic radical (m=4 or 5 in formula (V)), for example diphenols corresponding to the following formulae

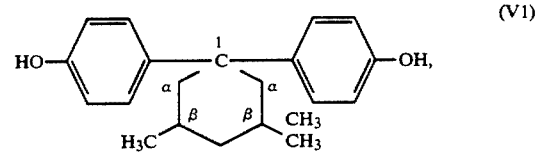

(V1)

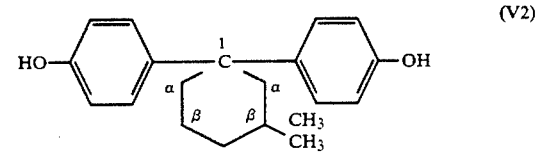

(V2)

and

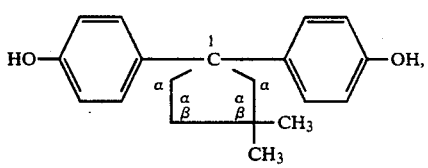

(V3)

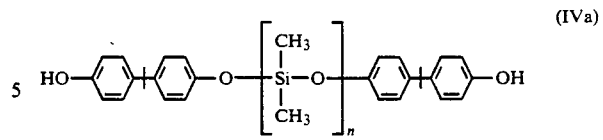

(IVa)

in which
n=40, 60 or 80.

the 1,1-bis-(4-hydroxyphenyl)-3,3,5-trimethyl cyclohexane (formula VI) being particularly preferred.

The diphenols of formula (V), their production and their use, optionally in combination with other diphenols, for the production of homopolycarbonates and copolycarbonates are the subject of German patent applications P 38 32 396.6 (Le A 26 344) and P 38 42 931.4 (Le A 26 318).

Examples of diphenols corresponding to formula (III) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones and also ring-methylated, ring-brominated and ring-chlorinated compounds thereof.

These and other suitable other diphenols of formula (III) are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1 570 703, 2 063 050, 2 063 052, 2 211 056, in FR-PS 1 561 518 and in the book by H. Schnell entitled "Chemistry and Physics of Polycarbonates", Interscience Publishers, New York, 1964.

Preferred diphenols of formula (III) are, for example, 4,4'-dihydroxydiphenyl, 2,2-bis-(4-hydroxyphenyl)-propane, 2,4-bis(4-hydroxyphenyl)-2-methylbutane, 1,1-bis-(4-hydroxyphenyl)-cyclohexane, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, 2,2-bis-(3,5-dichloro-4-hydroxyphenyl)-propane and 2,2-bis-(3,5-dibromo-4-hydroxyphenyl)-propane.

Particularly preferred diphenols corresponding to formula (III) are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-Bis-(4-hydroxyphenyl)-propane as the diphenol of formula (III) and 1,1-bis-(4-hydroxyphenyl)-3,3,5-trimethylcyclohexane of formula (VI) are particularly preferred.

The diphenols of formulae (III) and (V) may be used both individually and in admixture.

Diphenols corresponding to formula (IV), which may be used in quantities of at most 20% by weight, based on the total mols of the diphenols to be used, are described for example in EP-O 122 535 and in U.S. Pat. No. 3,189,662.

Suitable diphenols corresponding to formula (IV) are, for example, those corresponding to formula (IVa)

Suitable monophenols as chain terminators are, for example, phenol, p-tert.-butylphenol, p-cumylphenol and p-isooctylphenol.

Inert organic solvents for the two-phase interfacial grafting reaction are, for example, methylene chloride and chlorobenzene.

The quantity by weight of inert solvent is about 20 to 25 times the quantity by weight of graft base used in the grafting reaction. The quantity of solvent depends upon the particular quantity by weight of graft base used in the graft copolymer to be produced; with a small quantity of graft base, a small quantity of solvent is sufficient whereas, with a relatively large quantity of graft base in the graft, a relatively large quantity of solvent will be required.

Aqueous sodium hydroxide or aqueous potassium hydroxide for example may be used as the aqueous alkaline phase.

Suitable catalysts for the two-phase interfacial grafting reaction are, for example, tertiary amines such as, for example, triethylamine or N-ethylpiperidine.

The reaction times for the two-phase interfacial grafting reaction are between 5 minutes and 60 minutes while suitable reaction temperatures are in the range from 0° C. to 40° C.

The graft copolymers obtainable by the process according to the invention have molecular weights $\overline{M}w$ (weight average, as determined by light scattering) in the range from 80,000 to 1,000,000.

The graft copolymers obtainable by the process according to the invention are particularly suitable for improving the resistance of thermoplastic, aromatic polycarbonates to gasoline.

Accordingly, the present invention also relates to the use of the graft copolymers obtainable in accordance with the invention in quantities of 0.1% by weight to 35% by weight and preferably in quantities of 5% by weight to 25% by weight, based on the total weight of polycarbonate molding compound, for improving the resistance of thermoplastic aromatic polycarbonates to gasoline.

Accordingly, the present invention also relates to mixtures containing

A) thermoplastic, aromatic polycarbonates having $\overline{M}w$ values (weight average molecular weight, as determined by gel permeation chromatography after preliminary calibration) in the range from 15,000 to 40,000 and preferably in the range from 18,000 to 35,000 and B) the graft copolymers obtainable in accordance with the invention, component A) being present in quantities of 65% by weight to 99% by weight and preferably 75% by weight to 95% by weight and component B) being present in quantities of 0.1% by weight to 35% by weight and preferably 5% by weight to 25% by weight and the sum of components A)+B) in the mixtures being 100% by weight.

Any aromatic homopolycarbonates and aromatic copolycarbonates which are linear or branched in known manner and which are preferably prepared in known manner from the diphenols (III), (V) and optionally (IV) or (IVa) are suitable as the thermoplastic aromatic polycarbonates of component A).

Polycarbonates such as these are either known from the literature or may be obtained by known methods or are the subject of German patent applications P 38 32 396.6 (Le A 26 344) or P 38 42 931.4 (Le A 26 318).

The polycarbonates of component A) do not of course contain the rubbers obtainable by the process according to German patent application P 40 00 625.5 (Le A 27 441) in co-condensed form.

To produce the mixtures according to the invention, the polycarbonate component A) and the graft copolymer component B) may be mixed at a temperature above the softening temperature of the polycarbonate component used. This may be done, for example, in a single step by compounding during extrusion in standard screw extruders, for example at temperatures in the range from 280° to 350° C. Known machines are suitable for compounding. Twin-screw extruders are preferably used.

In addition, mixing may be carried out by mixing solutions of components A) and B) and subjecting the mixture to evaporation in an extruder.

$CH_2Cl_2$ is one example of a suitable solvent for the polycarbonate component; methylene chloride or chlorobenzene are examples of suitable solvents for the graft copolymer component.

Accordingly, the present invention also relates to a process for the production of the mixtures according to the invention of the thermoplastic polycarbonates of component A) and the graft copolymers of component B), characterized in that component A) and component B) are mixed at a temperature above the softening temperature of the particular component A) or solutions of the polycarbonate component A) are mixed with solutions of the graft copolymer component B) and the resulting mixture is subsequently freed from the solvent in known manner by evaporation.

If more than 8 to 1000 mol diphenol and more than 1 mol chain terminator per OH group of the polymer backbone are used for the same amount of polymer backbone, homopolycarbonate is formed in addition to the graft copolymers according to the invention, so that corresponding mixtures are obtained in a single step (in situ blend production). The quantity by weight of homopolycarbonate in the mixture with the graft copolymers according to the invention can be adjusted through the quantity of excess diphenol (0.5 to 99.5% by weight homopolycarbonate).

Accordingly, the present invention also relates to a process for the production of polycarbonate mixtures consisting of polycarbonate components A) and graft copolymer components B) by reaction of diphenols, monofunctional chain terminators, phosgene and polymers containing phenolic OH groups under two-phase interfacial polycondensation conditions in aqueous alkaline phase and in an inert organic solvent, optionally in the presence of a catalyst, for 5 minutes to 60 minutes at reaction temperatures of 0° C. to 40° C., characterized in that, a) for a predetermined molar quantity of polymers containing OH groups, b) diphenols are used in quantities of more than 1000 mol per OH group of the OH-group-containing polymer, the additional quantity of diphenols determining the quantity by weight of polycarbonate component A) in the mixture with the graft copolymer component B) which, in principle, may be regulated as required and amounts, for example, to between 99.9% by weight and 65% by weight and preferably to between 95% by weight and 75% by weight, based on the total weight of 100% by weight of A)+B), of polycarbonate component A, c) chain terminators are used in quantities of more than 1 mol per OH group of the polymer containing OH groups, the quantity of additional chain terminator for the production of the polycarbonate component A) from the excess diphenols according to b) having to be gauged in known manner so that the molecular weight $\overline{M}w$ of the polycarbonate component A) is in the range from 15,000 to 40,000 and preferably in the range from 18,000 to 35,000, and d) the rubbers containing 5 to 60 and preferably 5 to 40 phenolic OH groups obtainable by the process according to German patent application P 40 00 625.5 (Le A 27 441) are used as the polymers containing OH groups, and the mixtures obtained on completion of the reaction are worked up after removal of the aqueous phase.

The present invention also relates to the polycarbonate mixtures obtained by the process described above.

Hydroxphenyl-terminated hydrocarbon polymers are known as additives for improving the compatibility and adhesion of polymers containing polar groups, such as polyesters, polyurethanes etc. on the one hand and polyolefins on the other hand are known from JP-A 63/268 703 (Mitsubishi) cited at the beginning of the present specification.

They are distinguished by heat resistance and by chemical stability by virtue of their structure and, by polymerization into aromatic polyesters, polycarbonates, etc., provide these resins with flexibility and notched impact strength. No particulars are provided as to the method and extent of the polymerization or as to possible effectiveness in improving the resistance of polycarbonate resins to gasoline.

In addition, the rubbers containing 5 to 60 and preferably 5 to 40 phenolic OH groups obtainable by the process according to German patent application P 40 00 625.5 (Le A 27 441) can react with thermoplastic, aromatic polycarbonates by transesterification to form polycarbonate molding compounds which contain the rubbers chemically incorporated in the form of polycarbonate-grafted rubbers.

This transesterification reaction takes place at temperatures between 280° C. and 350° C., for example in standard degassing screw extruders, in the absence of catalysts over reaction times of from about 1 minute to about 3 minutes.

The ratio of the reactants, thermoplastic aromatic polycarbonate to rubber containing OH groups, is from 99.9:0.1 to 80:20 and preferably from 98:2 to 90:10.

The polycarbonate molding compounds obtained also show improved resistance to gasoline.

Accordingly, the present invention relates to a process for the modification of thermoplastic, aromatic polycarbonates having $\overline{M}w$ values (weight average molecular weight, as determined by gel permeation chromatography after preliminary calibration) in the range from 15,000 to 40,000 and preferably in the range from 18,000 to 35,000, characterized in that the rubbers containing 5 to 60 and preferably 5 to 40 phenolic OH groups obtainable by the process according to German patent application P 39 28 660.6 (Le A 26 793) are mixed in quantities of 0.1% by weight to 20% by weight and preferably in quantities of 2% by weight to 10% by weight, based on the total weight of the thermoplastic aromatic polycarbonate and rubber, for 1 to 3 minutes and preferably for 1.5 to 2 minutes at temperatures of 280° C. to 350° C. in the absence of catalysts and the resulting mixture is subsequently extruded and worked up in the usual way.

The present invention also relates to the modified polycarbonate molding compounds obtainable by the process according to the invention.

The polycarbonates already defined as component A) are suitable as the thermoplastic aromatic polycarbonates to be modified.

Where necessary, the polycarbonate molding compounds obtainable by the process according to the invention may also contain the additives typically used for polycarbonates and for rubbers, such as stabilizers against UV light, heat and moisture, flameproofing agents, antiagers, mold release agents and/or fillers in the usual quantities. These additives are incorporated in the usual way, for example analogously during the already described compounding of components A) and B).

The polycarbonate molding compounds obtainable by the process according to the invention may be processed in known manner in standard machines to moldings of any kind, such as injection molded articles, sheets, films, pipes.

Moldings of the polycarbonate molding compounds obtainable in accordance with the invention may be industrially used, above all in the automative field where resistance to gasoline is required and also, for example, as seals for pipe systems of various kinds, i.e. in machine and plant construction and also in the electrical field.

The following Examples merely represent a limited choice with regard to the practicability of the present invention.

Many other embodiments are possible within the scope of the disclosure by permutation of the individual parameters required in accordance with the invention.

EXAMPLES OF THE PRODUCTION OF GRAFT POLYMERS

EXAMPLE 1 a) Graft base 800 g of an EPDM resin (prepared from 46% by weight ethylene, 45% by weight propylene and 9% by weight 5-ethylidene bicyclo-(2,2,1)-hept-2-ene, Mooney viscosity (1+4) at 100° C.=90) are masticated in a Pomini kneader at a kneader temperature of 60° C. and at a rotational speed of 40 1/min. After 1 minute, 72 g phenol, 7.2 g methanesulfonic acid and another 100 g EPDM are added, followed by mixing for another 8 minutes. The melt temperature rises to 90°–100° C.

A bound content of 3.2% by weight is determined by complete extraction of the excess phenol. In the IR spectrum, the band at 1,600 1/cm indicates the presence of aromatic side groups.

The average number of lateral hydroxyphenyl groups was calculated at 27.23 for a molecular weight $M_n$ of the EPDM, as determined by gel permeation chromatography, of 80,000 g/mol.

b) Grafting reaction 2.70 kg (27 mol) phosgene are introduced over a period of 1 hour with stirring at 20° to 25° C. into a mixture of 4.56 kg (20 mol) 2,2-bis-(4-hydroxyphenyl)-propane (BPA); 84.5 g (2.9 mol-%, based on BPA) p-tert.-butylphenol; 8 kg sodium hydroxide (w 45%); 40 l water, 30 kg chlorobenzene and 508 g (10% by weight, based on Pn of polycarbonate) of the graft base described in a) dissolved in 13.5 kg chlorobenzene. 28 ml (2 mol-%, based on BPA) N-ethyl piperidine are then added, followed by stirring for 1 hour. After addition of 20 l methylene chloride, the organic phase is separated off, washed until free from electrolyte and, after removal of the methylene chloride by distillation, is extruded at 240° to 260° C. 4 kg product having a relative solution viscosity $\eta_{rel}$ of 1.275 were obtained. The apparent molecular weight of the graft copolymer $\overline{M}n$ (as determined by gel permeation chromatography with polycarbonate calibration) is 14,659 g/mol, corresponding to an average degree of polycondensation p of the polycarbonate side branches of 57.7.

EXAMPLE 2 a) Graft base 900 g of a partly hydrogenated polybutadiene-co-acrylonitrile rubber (residual double bond content 4%) containing 43% acrylonitrile and having a Mooney viscosity (1+4) of 75° at 100° C. is reacted with phenol under the same conditions as in Example 1a.

In this case, the bound phenol content is 3.2% by weight.

The average number of lateral hydroxyphenyl groups was calculated at 23.8 for a molecular weight of the polybutadiene-co-acrylonitrile rubber Mn, as determined by gel permeation chromatography, of 70,000 g/mol.

b) Grafting reaction 15 g (0.1 mol) phosgene are introduced with stirring over a period of 15 minutes at 20° to 25° C. into a mixture of 22.8 g (0.10 mol) 2,2-bis-(4-hydroxyphenyl)-propane (BPA), 450 mg (=3 mol-%, based on BPA) p-tert.-butylphenol; 20 g (0.5 mol) solid sodium hydroxide, 400 ml water, 400 ml methylene chloride and 2.28 g (8.2% by weight, based on Pn of polycarbonate) of the graft base described in a). 0.14 ml (1 mol-%, based on BPA) N-ethyl piperidine are then added, followed by stirring for 1 hour. The organic phase is separated off, washed until free from electrolyte and, after removal of most of the methylene chloride by distillation, is freed from the solvent at 80° C. in a vacuum drying cabinet. 27 g of product having a relative viscosity $\eta_{rel}$ of 1.350 were obtained. The apparent molecular weight of the graft copolymer Mn (as determined by gel permeation chromatography with polycarbonate calibration) is 15,546 g/mol, corresponding to an average degree of polycondensation p of the polycarbonate side branches of 61.2.

EXAMPLE 3 a) Graft base 800 g of an EPDM resin (prepared from 46% by weight ethylene, 45% by weight propylene and 9% by weight 5-ethylidene bicyclo-(2,2,1)-hept-2-ene, Mooney viscosity (1+4) at 100° C.=90) are masticated in a Pomini kneader at a kneader temperature of 60° C. and at a rotational speed of 40 1/min. After 1 minute, 72 g phenol, 7.2 g methanesulfonic acid and another 100 g EPDM are added, followed by mixing for another 8 minutes. The melt temperature rises to 90°-100° C.

A bound content of 3.2% by weight is determined by complete extraction of the excess phenol. In the IR spectrum, the band at 1,600 1/cm indicates the presence of aromatic side groups.

The average number of lateral hydroxyphenyl groups was calculated at 27.23 for a molecular weight Mn of the EPDM, as determined by gel permeation chromatography, of 80,000 g/mol.

b) Grafting reaction 1.80 kg (187 mol) phosgene are introduced with stirring over a period of 1 hour at 20° to 25° C. into a mixture of 1.026 kg (4.5 mol) 2,2-bis-(4-hydroxyphenyl)-propane (BPA) 1.705 g (5.5 mol) 1,1-bis-(4-hydroxyphenyl)-3,3,5-trimethyl cyclohexane, 9.91 g (0.105 mol) phenol, 3,366 kg potassium hydroxide, 27 l water, 10 kg chlorobenzene, 10 kg methylene chloride and 254 g of the graft base described in a) dissolved in 18.5 kg chlorobenzene. 14 ml (1 mol, based on BPA) N-ethyl piperidine are then added, followed by stirring for 1 hour. After addition of 20 l methylene chloride, the organic phase is separated off, washed until free from electrolyte and, after removal of methylene chloride by distillation, is extruded at 330° C. 2.3 kg product having a relative solution viscosity $\eta_{rel}$ of 1.355 were obtained. The apparent molecular weight of the graft copolymer Mn (as determined by gel permeation chromatography with polycarbonate calibration) is 29,406 g/mol, corresponding to an average degree of polycondensation p of the polycarbonate side branches of 98.3.

Blend production

EXAMPLE 4

8 Parts of a polycarbonate (PC) of bisphenol A having a relative solution viscosity $\eta_{rel}$ of 1.290 (as measured in methylene chloride at 5 g/l and at 25° C.) and 1 part of the graft copolymer (corresponding to 1% by weight EPDM in the blend) were mixed by compounding at 260° C. in a ZSK 32.

EXAMPLE 5

As Example 4, but with 1 part of the graft copolymer of Example 1 (corresponding to 5% by weight EPDM in the blend).

EXAMPLE 6 a) Graft base (cf. DE 365 00 366 A1)

A solution of 5 g methanesulfonic acid, 200 g phenol and 200 g o-dichlorobenzene is added dropwise under nitrogen over a period of 15 minutes at 150° C. to a mixture of 200 g EPDM resin (prepared from 65% by weight ethylene, 30% by weight propylene and 5% by weight 5-ethylidene bicyclo(2,2,1)-hept-2-ene, Mooney viscosity (1+4) at 100° C.=85, and 1,800 g o-dichlorobenzene, followed by reaction for 4 hours at 170° to 175° C. After cooling to room temperature, the reaction mixture is diluted with 2.8 kg chlorobenzene. The organic phase is washed three times with 5% aqueous sodium hydroxide until free from phenol and then with water until neutral (pH=6.5). The resulting solution is further used. After working up, a sample showed a phenol content of 3.1% by weight.

The average number of lateral hydroxyphenyl groups was calculated at 27 for a molecular weight Mn of the EPDM, as determined by gel permeation chromatography, of 82,000 g/mol.

b) In situ blend production 2.7 kg (27 mol) phosgene are introduced with stirring over a period of 1 hour at 20° to 25° C. into a mixture of 4.56 kg (20 mol) 2,2-bis-(4-hydroxyphenyl)-propane (BPA), 96 g (3.3 mol-%, based on BPA) p-tert.-butylphenol, 8 kg sodium hydroxide (w=45%), 40 l water, 12 kg chlorobenzene and 1,214.5 g (=1% by weight EPDM in the final blend) of the graft base described in a) dissolved in 25 kg methylene chloride. 28 ml (=1 mol-%, based on BPA) N-ethyl piperidine are then added, followed by stirring for 1 hour. The organic phase is separated off, washed until free from electrolyte and, after removal of the methylene chloride by distillation, is extruded at 280° C. 4.8 kg product having a relative solution viscosity $\eta_{rel}$ of 1.285 were obtained. The apparent molecular weight Mn of the graft copolymer (as determined by gel permeation chromatography with polycarbonate calibration) is 14,213 g/mol, corresponding to an average degree of polycondensation p of the polycarbonate side branches of 55.9.

EXAMPLE 7 a) Graft base 800 g of an EPDM resin (prepared from 46% by weight ethylene, 45% by weight propylene and 9% by weight 5-ethylidene bicyclo-(2,2,1)-hept-2-ene, Mooney viscosity (1+4) at 100° C.=90) are masticated in a Pomini kneader at a kneader temperature of 60° C. and at a rotational speed of 40 1/min. After 1 minute, 72 g phenyl, 7.2 g methanesulfonic acid and another 100 g EPDM are added, followed by mixing for another 8 minutes. The melt temperature rises to 90°-100° C.

A bound content of 3.2% by weight is determined by complete extraction of the excess phenol. In the IR spectrum, the band at 1,600 1/cm indicates the presence of aromatic side groups.

b) In situ blend production 2.7 kg (27 mol) phosgene are introduced with stirring over a period of 1 hour at 20° to 25° C. into a mixture of 4.56 kg (20 mol) 2,2-bis-(4-hydroxyphenyl)-propane (BPA), 98.72 g (3.5 mol-%, based on BPA) p-tert.-butylphenol, 8 kg sodium hydroxide (w=45%), 40 l water, 3.5 kg chlorobenzene and 254 g (=5% by weight EPDM, based on final polycarbonate blend) of the graft base described in a) dissolved in 8.8 kg chlorobenzene. 28 ml (=1 mol-%, based on BPA) N-ethyl piperidine are then added, followed by stirring for 1 hour. After the addition of 20 l methylene chloride, the organic phase is separated off, washed until free from electrolyte and, after removal of the methylene chloride by distillation, is extruded at 260°-280° C. 4.2 kg product having a relative solution viscosity $\eta_{rel}$ of 1.269 were obtained. The apparent molecular weight Mn of the graft copolymer (as determined by gel permeation chromatography with polycarbonate calibration) is 14,659 g/mol, corresponding to an average degree of polycondensation p of the polycarbonate side branches of 57.7.

EXAMPLE 8 a) Graft base 800 g of an EPDM resin (prepared from 41% by weight ethylene, 45% by weight propylene and 9% by weight 5-ethylidene bicyclo-(2,2,1)-hept-2-ene, Mooney viscosity (1+4) at 100° C.=90) are masticated in a Pomini kneader at a kneader temperature of 60° C. and at a rotational speed of 40 1/min. After 1 minute, 72 g phenol, 7.2 g methanesulfonic acid and another 100 g EPDM are added, followed by mixing for another 8 minutes. The melt temperatures rises to 90°-100° C.

A bound content of 3.2% by weight is determined by complete extraction of the excess phenol. In the IR spectrum, the band at 1,600 1/cm indicates the presence of aromatic side groups.

b) Reactive blending (graft production)

9 Parts of a polycarbonate (PC) of bisphenol A having a relative solution viscosity $\eta_{rel}$ of 1.290 (as measured in methylene chloride at 5 g/l and at 25° C.) and 1 part of the graft base described in a) (corresponding to 10% by weight EPDM in the blend) were mixed by compounding at 280° C. in a ZSK 32. 4.2 kg product having a relative solution viscosity $\eta_{rel}$ of 1.270 were obtained. The apparent molecular weight of the graft copolymer Mn (as determined by gel permeation chromatography with polycarbonate calibration) is 12,992 g/mol, corresponding to an average degree of polycondensation p of the polycarbonate side branches of 51.4.

To determine the improved resistance to gasoline, test bars measuring 80×10×4 mm are made from the materials by injection molding and are subjected in a flat position to three-point deflection measurement ($l_o$=40 mm). Maximum outer fiber strains $\epsilon_R$ of 0.5, 1, 2, 3 and 4% are produced by defined deflection. A new test specimen is used for each outer fiber strain.

With the maximum outer fiber strain firmly set, the deflection thus produced is maintained in air for 1 minute before the test specimen is contacted with the test medium (toluene/isooctane 1:1, 20° C.) by immersion therein. When cracks develop through the effect of the medium, there is a fall in modulus in the outer fibers which is recorded. For the purposes of quantitative evaluation, the modulus values are determined after contact times of 2 and 20 minutes and are based on the initial modulus ($\delta/\delta_o$ in %). A fall in the relative modulus values to 0% signifies the failure of the test specimen while a relative modulus value of 100% signifies that no swelling has occurred in the medium.

Test specimens of bisphenol A polycarbonate (BPA-PC) having a relative solution viscosity $\eta_{rel}$ of 1.290 and a copolycarbonate (co-PC) of 55 mol-% 1,1-bis-(4-hydroxyphenyl)-3,3,5-trimethyl cyclohexane and 45 mol-% bisphenol A having a relative solution viscosity $\eta_{rel}$ of 1.299 are also tested for comparison.

| Example | $\epsilon_R =$ | Relative flexural stress in % ($\delta/\delta_o$) after 2/20 mins at | | | | |
|---|---|---|---|---|---|---|
| | | 0.5% | 1% | 2% | 3% | 4% |
| Comparison | | | | | | |
| BPA-PC | | 95/0 | 15/0 | 0/0 | 0/0 | 0/0 |
| Co-PC | | 87/0 | 0/0 | 0/0 | 0/0 | 0/0 |
| Graft polymers | | | | | | |
| 1 | | 97/93 | 97/90 | 93/80 | 93/80 | 93/80 |
| 3 | | 97/91 | 95/83 | 92/83 | 91/81 | 90/74 |
| Melt compounds | | | | | | |
| 4 | | 95/2 | 34/0 | 5/0 | 0/0 | 0/0 |
| 5 | | 97/93 | 94/0 | 81/0 | 79/0 | 80/0 |
| In situ blends | | | | | | |
| 6 | | 95/3 | 31/0 | 5/0 | 0/0 | 0/0 |
| 7 | | 95/91 | 95/5 | 80/0 | 78/0 | 78/0 |
| Reactive blending 8 | | 97/94 | 96/90 | 91/80 | 90/73 | 88/69 |

What is claimed is:

1. A process for producing a graft copolymer comprising reacting (i) a rubber which contains 5 to 60 phenolic OH groups,
(ii) at least one diphenol,
(iii) phosgene, and
(iv) at least one monophenol chain terminator, in an aqueous alkaline phase with addition of an inert organic solvent under the conditions of two-phase interfacial polycondensation, the quantity of said diphenol and said monophenol being selected to result in the formation of polycarbonate chains having a number average molecular weight, as determined by gel chromatography, of 2,000 to 250,000 g/mol, wherein said rubber is the product of a reaction in bulk of a rubber having a double bond content of 3 to 250 per 100 carbon atoms with phenol, for 1 to 30 minutes at temperatures of 50° to 150° C.

2. The process of claim 1 wherein said formation of polycarbonate chains is carried out in the presence of a catalyst.

3. The graft copolymer obtained by the process of claim 1.

4. A thermoplastic molding composition comprising
(A) a thermoplastic, aromatic polycarbonate having a weight average molecular weight of 15,000 to 40,000 and
(B) the graft copolymers claimed in claim 3, said (A) being present in a quantity of 65% to 99.9% by weight and component (B) in a quantity of 0.1% to 35% by weight and the sum of components (A)+(B) in said composition being 100% by weight.

5. A process for the production of the composition of claim 4, characterized in that said solutions of (A) are mixed with solutions of said (B) and the resulting mixture is subsequently freed from solvent by evaporation.

6. A process for the production of a polycarbonate molding composition comprising a polycarbonate component and a graft copolymer component said process comprising reacting at least one diphenol, a monofunctional chain terminator, phosgene and a polymer containing phenolic OH groups under the conditions of a two-phase interfacial polycondensation in an aqueous alkaline phase and in an inert organic solvent, for 5 minutes to 60 minutes at reaction temperatures of 0° C. to 40° C., characterized in that, (a) said diphenol is used in a quantity of more than 1000 mol per OH group of the OH-group-containing polymer, and
(b) said chain terminator is used in a quantity of more than 1 mol per OH group of said polymer containing OH groups, and
(c) excess quantities of chain terminator and diphenol are present in amounts corresponding to the production of said polycarbonate component so that the weight average molecular weight of said polycarbonate component is in the range of 15,000 to 40,000, and
(d) rubbers containing 5 to 60 phenolic OH groups are used as the polymers containing OH groups, said rubbers being obtained by reacting rubbers having a double bond content of 3 to 250 per 1,000 carbon atoms in the rubber with phenols, in bulk for 1 minute to 30 minutes at temperatures of 50° C. to 150° C., and, on completion of the reaction, the aqueous phase is removed and the polycarbonate mixture is worked up.

7. A polycarbonate molding composition obtained by the process of claim 6.

* * * * *